United States Patent
He et al.

(10) Patent No.: US 9,866,406 B2
(45) Date of Patent: Jan. 9, 2018

(54) OVERLAY SWITCH

(71) Applicant: International Business Machines Corporation, Armonk, NY (US)

(72) Inventors: Jing He, Wuxi (CN); Denghui Huang, Hangzhou (CN); Jin Ming Shang, Wuxi (CN); Yun Sun, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 14/740,437

(22) Filed: Jun. 16, 2015

(65) Prior Publication Data

US 2015/0381485 A1 Dec. 31, 2015

(30) Foreign Application Priority Data

Jun. 27, 2014 (CN) .......................... 2014 1 0302280

(51) Int. Cl.
*H04L 12/28* (2006.01)
*H04L 12/46* (2006.01)

(52) U.S. Cl.
CPC ................ *H04L 12/4633* (2013.01)

(58) Field of Classification Search
CPC .............. H04L 47/10; H04L 12/4604; H04L 29/06102; H04L 29/06142; H04W 28/02; H04W 28/0205; H04W 28/021; H04W 28/0247; H04W 28/0252; H04W 28/0257; H04W 28/0263; H04W 28/0268; H04W 28/0273; H04W 84/04; H04W 88/06
USPC ............... 370/235, 338, 349, 392, 428, 469; 709/202, 238, 246; 455/450, 453
See application file for complete search history.

(56) References Cited

U.S. PATENT DOCUMENTS

| | | |
|---|---|---|
| 9,172,557 B2 | 10/2015 | Biswas et al. |
| 9,264,352 B2 | 2/2016 | Benny et al. |
| 9,438,508 B1 | 9/2016 | Medved et al. |
| 2013/0163594 A1* | 6/2013 | Sharma .................. H04L 45/64 370/392 |
| 2013/0170490 A1 | 7/2013 | Kreeger et al. |
| 2013/0287036 A1 | 10/2013 | Banavalikar et al. |
| 2013/0332602 A1 | 12/2013 | Nakil et al. |

(Continued)

OTHER PUBLICATIONS

Kawashima et al., "Non-Tunneling Edge-Overlay Model using OpenFlow for Cloud Datacenter Networks", 2013 IEEE 5th International Conference on Cloud Computing Technology and Science, © 2013, IEEE, pp. 176-181.

(Continued)

*Primary Examiner* — Dady Chery
(74) *Attorney, Agent, or Firm* — Isaac J. Gooshaw (57) ABSTRACT

The present invention discloses an overlay switch (OSW) and a method used by the same. A received unicast packet needs to pass a waypoint chain including a number of waypoints. A network address of a first waypoint of the waypoint chain and an underlay network address of a second OSW connected to the first waypoint are obtained. In response to a determination that the second OSW is not the first OSW the unicast packet is encapsulated into a first underlay network packet according to a specification of an overlay network. A field of a destination header of the first underlay network packet includes the underlay network address of the second OSW. The first underlay network packet is sent to the second OSW.

20 Claims, 8 Drawing Sheets

(56) References Cited

U.S. PATENT DOCUMENTS

2014/0016501 A1  1/2014  Kamath et al.
2014/0050223 A1  2/2014  Foo et al.

OTHER PUBLICATIONS

"VXLAN Overview: Cisco Nexus 9000 Series Switches"; Cisco, © 2015, pp. 1-10, <http://www.cisco.com/c/en/us/products/collateral/switches/nexus-9000-series-switches/white-paper-c11-729383.pdf>.
Foreign Patent Application No. 201410302280.1 entitled "Overlay Switch", filed Jun. 27, 2014.

* cited by examiner

OVERLAY SWITCH

BACKGROUND OF THE INVENTION

The present invention relates to network technology, and more specifically, to an overlay switch and a method used by the same.

An overlay network is a network built on top of another network, and accordingly, the other network is known as underlay network. Communication nodes in the overlay network may be connected by virtual or logical links, and these links are connected by physical links of the underlay network. A Virtual eXtensible Local Area Network (Vx-LAN) is a network technology by which an overlay network can be implemented.

SUMMARY

Embodiments of the present invention provide an overlay switch, and a method, system, and program product used by an overlay switch (OSW).

According to one aspect of the present invention, there is provided a method used by an overlay switch (OSW). The method comprising the following steps. In response to receiving a unicast packet to be sent to a first OSW, wherein the unicast packet needs to pass a waypoint chain including a number of waypoints. Executing steps of: Obtaining a network address of a first waypoint of the waypoint chain and an underlay network address of a second OSW connected to the first waypoint. In response to a determination that the second OSW is not the first OSW, encapsulating the unicast packet into a first underlay network packet according to a specification of an overlay network, wherein a field of a destination header of the first underlay network packet includes the underlay network address of the second OSW. Sending the first underlay network packet to the second OSW.

According to another aspect of the present invention, there is provided an overlay switch (OSW). The OSW comprising the following modules. A first receiving module configured to receive a unicast packet, wherein the unicast packet needs to pass a waypoint chain consisting of a number of waypoints. A first obtaining module configured to obtain a network address of a first waypoint of the waypoint chain and an underlay network address of a second OSW connected to the first waypoint. A first execution module configured to respond to a determination that the second OSW is not a first OSW by encapsulating the unicast packet into a first underlay network packet according to a specification of an overlay network, wherein a field of a destination header of the first underlay network packet includes the underlay network address of the second OSW. Sending the first underlay network packet to the second OSW.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

An overlay network is a network built on top of another network, and accordingly, the other network is known as underlay network. Communication nodes in the overlay network may be connected by virtual or logical links, and these links are connected by physical links of the underlay network. A Virtual eXtensible Local Area Network (Vx-LAN) is a specification of an overlay network, i.e., is a network technology by which an overlay network can be implemented. An overlay switch (OSW) is a data communication component serving an overlay network, which is typically a virtual switch. In general, an OSW receives packets from source communication nodes of the overlay network, encapsulates packets of original overlay network according to address of destination communication nodes, and sends them to other OSWs. The OSW also receives packets from other OSWs, de-capsulates and sends them to destination communication nodes of a corresponding overlay network.

In an overlay network, some nodes in the network are known as waypoints, which are mainly used in service systems providing particular function, such as firewall and statistics collecting device. A waypoint chain (also known as service chain) is a broad term, which is often used to describe an application model providing a series of services in a specific order. To be specific, as used herein, it is a service chain consisting of a sequential series of waypoint nodes in a network. Typically, such a service chain is deployed between two communication nodes to detect network traffic, for example, {firewall, intrusion detection system} forms a service chain, network traffic from a source communication node will first be processed by the firewall and then by the intrusion detection system, before it is sent to a destination communication node.

Typically, when two communication nodes in an overlay network communicate, at least one waypoint needs to be passed. However, some solutions for overlay networks only provide normal end-to-end communication between the two communication nodes, and cannot add a waypoint chain consisting of a number of waypoints between these two communication nodes to provide additional service.

A number of embodiments will now be described in more detail with reference to the accompanying drawings, in which the certain embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
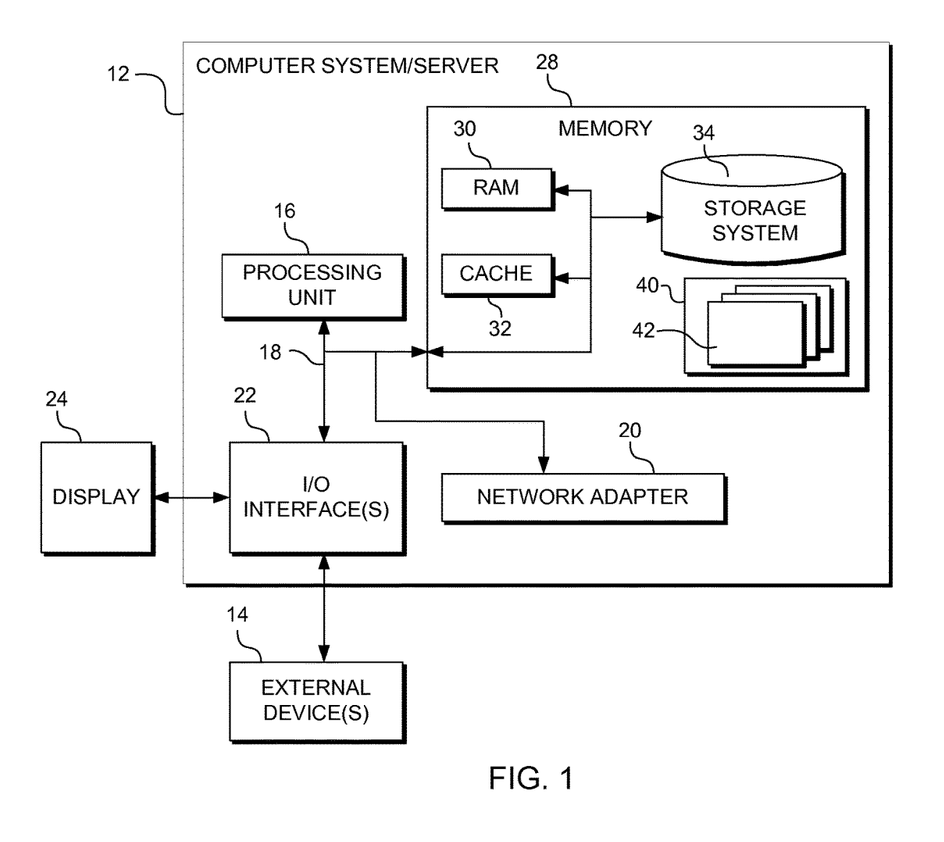
FIG. 1 shows a block diagram illustrating an exemplary computer system/server, in accordance with an exemplary embodiment of the present invention.

Referring now to FIG. 1, a block diagram illustrating an exemplary computer system/server 12. Computer system/server 12 is only illustrative and is not intended to suggest any limitation as to the scope of use or functionality of embodiments of the invention described herein.

As shown in FIG. 1, computer system/server 12 has the form of a general-objective computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
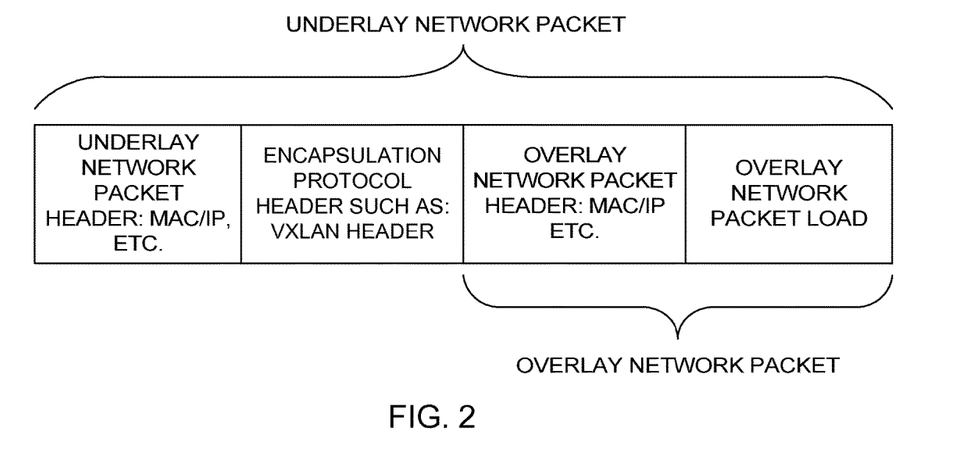
FIG. 2 shows structure of a typical packet in an overlay network environment, in accordance with an exemplary embodiment of the present invention.

FIG. 2 shows structure of a typical packet in an overlay network environment. A unicast packet sent by a source communication node in the overlay network (such as a virtual machine (VM)) to an OSW is an overlay network packet, which includes a header and a load as shown in FIG. 2. The header of the overlay network packet, as shown, includes an address of a source communication node and address of a destination communication node (the address corresponding to MAC address in a Layer-2 network and corresponding to IP address in a Layer-3 network). In this embodiment, the OSW encapsulates a header of an underlay network packet and encapsulate a protocol header on the overlay network packet after receiving this packet, thereby forming an underlay network packet. Specifically, in this embodiment, how to encapsulate header of the underlay network packet and encapsulate the protocol header is determined based on the header of the overlay network packet. The ultimately encapsulated underlay network packet is delivered over the underlay network. By taking a destination IP address in the header of the underlay network packet as a next hop of the underlay network, the underlay network may send the underlay network packet to a corresponding OSW, which then de-capsulates the overlay network packet and sends it to a waypoint or to the destination communication node.

TABLE 1

| SRC_VM | DST_VM | WAYPOINT_CHAIN |
|---|---|---|
| VM1_IP/VM1_MAC | VM2_IP/VM2_MAC | {W1, W2} |
| ... | ... | ... |

In one embodiment of the present invention, relevant information of waypoints contained in a waypoint chain is configured by a system administrator as needed. The waypoint chain may be either stored in a separate server, or stored in each OSW of the overlay network, or even first stored in a separate server, and then fetched by each OSW from the separate server and stored therein, and so on. Table 1 shows information contained in a waypoint chain, wherein, the column source-virtual-machine (SRC_VM) provides address of source communication nodes, the column destination-virtual-machine (DST_VM) provides an address of destination communication nodes. For example, the address may be a media access control (MAC) address in case of a Layer-2 network, or may be an IP address in case of a Layer-3 network, or it may contain both MAC address and Internet Protocol (IP) address, and so on. The column WAYPOINT_CHAIN includes a set of waypoints W1 and W2 that needs to be passed when a network packet is sent from a source communication node VM1 to a destination communication node VM2. For example, the second row in Table 1 indicates that, a packet sent between VM1 and VM2 must pass the waypoint chain {W1, W2}, wherein W1/W2 is an identification of each waypoint in this waypoint chain. In fact, the W1 here contains underlay network address of OSW1 connected to W1 and overlay network address of the waypoint W1 itself, and the two addresses are not shown in Table 1. In the embodiments described herein, for simplicity, all the overlay network addresses are directly called "network address", and the underlay network address is specifically denoted as an "underlay network address". In some scenarios and embodiments, the underlay network address is a MAC address, or an IP address, or includes both. In one embodiment, there is a plurality of waypoints connecting to one OSW in the waypoint chain. If a waypoint in the waypoint chain only connects to one OSW, then identification of the waypoint may be used to identify such an OSW, or may not be used for such a purpose. In some embodiments, identification of waypoints in a waypoint chain (such as W1 and W2) may also correspond with another type of identification. Such other types of identification may also be in one-to-one correspondence with the identification of W1 or W2. For example, such an identification may include identifying network addresses of W1 or W2, which are in one-to-one correspondence with W1 and W2. In another example, such an identification may include identifying other content that may identify waypoints. For example, there may be an index that indicates W1 or W2 in the waypoint chain, for example, W1 is a first waypoint in the waypoint chain and corresponding index is 1, and corresponding index of W2 is 2, and so on. This is can be directed to the case where there is a plurality of waypoints connecting to one OSW in the waypoint chain.

Figure 3:
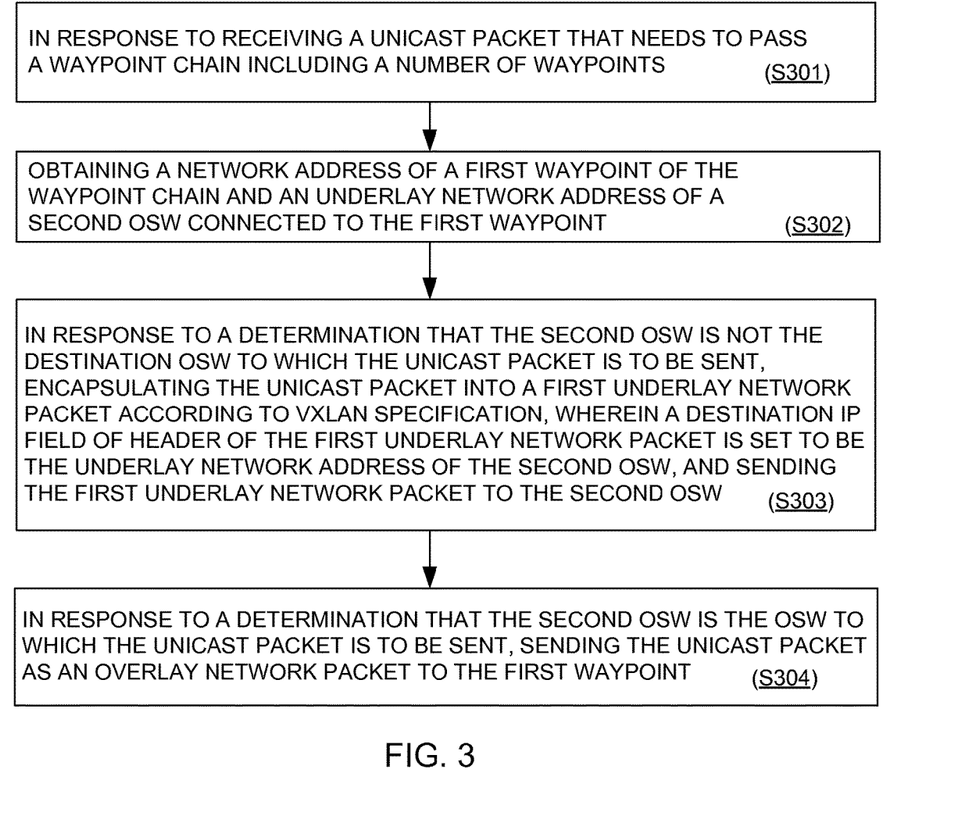
FIG. 3 illustrates a flow diagram of a method used by an overlay switch, in accordance with an exemplary embodiment of the present invention.

According to one embodiment of the present invention, there is disclosed a method used by an overlay switch. FIG. 3 illustrates a flow diagram of a method used by such an overlay switch. According to FIG. 3, the method comprises: in step S301, in response to receiving a unicast packet, wherein the unicast packet needs to pass a waypoint chain consisting of a number of waypoints, executing steps of: in step S302, obtaining a network address of a first waypoint of the waypoint chain and an underlay network address of a second OSW connected to the first waypoint; in step S303, in response to a determination that the second OSW is not the destination OSW to which the unicast packet is to be sent, encapsulating the unicast packet into a first underlay network packet according to VxLAN specification, wherein a destination IP field of header of the first underlay network packet is set to be the underlay network address of the second OSW, and sending the first underlay network packet to the second OSW; and in step S304, as an alternative to S303, in response to a determination that the second OSW is the OSW to which the unicast packet is to be sent, sending the unicast packet as an overlay network packet to the first waypoint.

Figure 4:
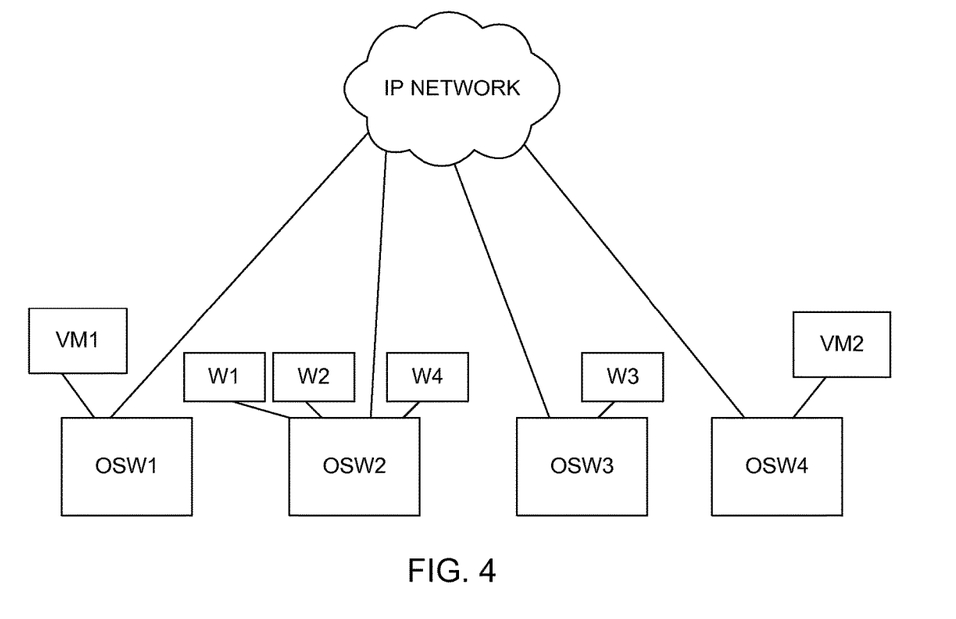
FIG. 4 shows a diagram of an application scenario in which a communication node sends a packet to another communication node through a waypoint chain, in accordance with an exemplary embodiment of the present invention.

FIG. 4 shows a diagram of an application scenario in which a communication node VM1 sends a packet to another communication node VM2 through a waypoint chain, wherein, VM1 is connected to OSW1 (not shown), VM2 is connected to OSW4 (not shown), between which a waypoint chain {W1, W2, W3, W4} needs to be passed, and W1, W2 and W4 are connected to OSW2 (not shown), W3 is connected to OSW3 (not shown). Since the present scenario includes a case in which one OSW is connected to a plurality of waypoints, identification of a next waypoint needs to be added in the underlay network packet. This disclosure includes a method that could be implemented by an OSW when taking such a scenario into account. Here, it is assumed that information of the waypoint chain has already been stored in each OSW. Those skilled in the art will appreciate that where the waypoint chain is stored will not influence the method that needs to be implemented by an OSW.

The communication in the scenario set forth above using the components of FIG. 4 may be divided into five stages. In the first stage, the flow corresponding to the method shown in FIG. 3, i.e., as implemented by OSW1 in FIG. 4, includes: In step 1, OSW1 receives a unicast packet from a source communication node VM1, which is an overlay network packet as shown in FIG. 2. In step 2, based on source MAC/source IP address and destination MAC/destination IP address of the header of the overlay network packet, OSW1 obtains a waypoint chain {W1-W4} between the source communication node and the destination communication node through a query. As such, OSW1 determines that the unicast packet needs to go through a waypoint chain consisting of a number of waypoints, and may further obtain underlay network address of an OSW2 connected to the first waypoint through information of the waypoint chain {W1-W4}. In step 3, when encapsulating the packet according to VxLAN specification, i.e., forming the underlay network packet as shown in FIG. 2, OSW1 sets the destination IP field in the header of the underlay network packet to the underlay network address of OSW2, which corresponds to the first waypoint in the waypoint chain, as a next hop of the underlay network packet. Then OSW1 sends the encapsulated underlay network packet to OSW2.

In some embodiments and scenarios, in the waypoint chain, there may be a case where one OSW is connected to a plurality of waypoints. For example, it can be seen from FIG. 4 that, the waypoints W1, W2 and W4 are all connected to OSW2. Assuming that OSW1 is the first waypoint, sometimes it may be difficult for OSW2 to distinguish whether to send the underlay network packet to W1, W2 or W4, especially when it is returned from OSW3 to OSW2. Thus, in one embodiment, in response to a case that there are a plurality of waypoints in the waypoint chain that are connected to one OSW, each underlay network packet also contains therein an identification of a next waypoint to which that underlay network packet is to be sent. In other words, an identification in one-to-one correspondence with W1, W2, W3 and W4 in Table 1 is included in such an underlay network packet. In one embodiment and scenario, when encapsulating the packet according to VxLAN specification, identification of the next waypoint may also be encapsulated into the underlay network packet.

Figure 5:
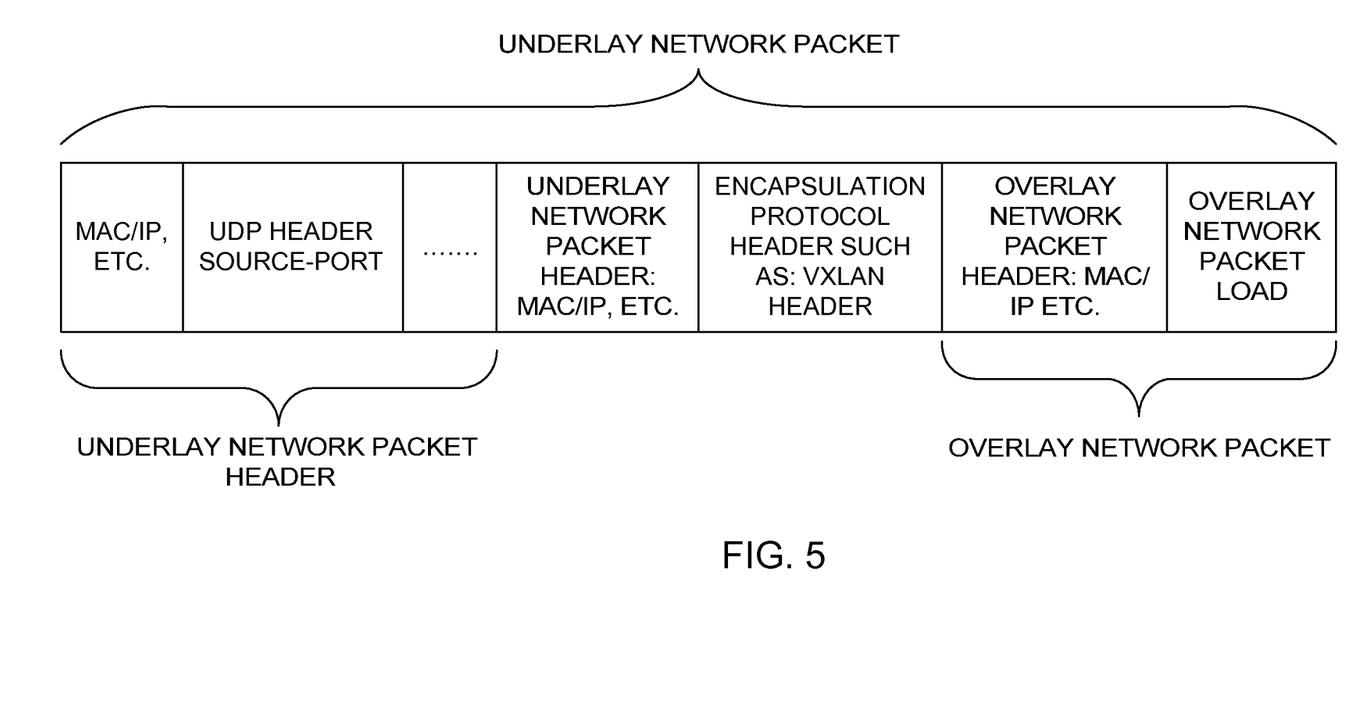
FIG. 5 shows a network packet that is configured such that a source port field of a user datagram protocol (UDP) header of an underlay network packet header is set to indicate an index in a corresponding waypoint chain, in accordance with an exemplary embodiment of the present invention.

In one embodiment, as shown in FIG. 5, a network packet is configured such that a source port field of a user datagram protocol (UDP) header of an underlay network packet header is set to indicate a W1 index in a corresponding waypoint chain, here waypoint 1 (W1) is indicated. Those skilled in the art will appreciate that, an unused position inside the overlay network packet or in a header of the encapsulation protocol may be customized or selected, to place an identification of W1 in the corresponding waypoint chain.

Figure 6:
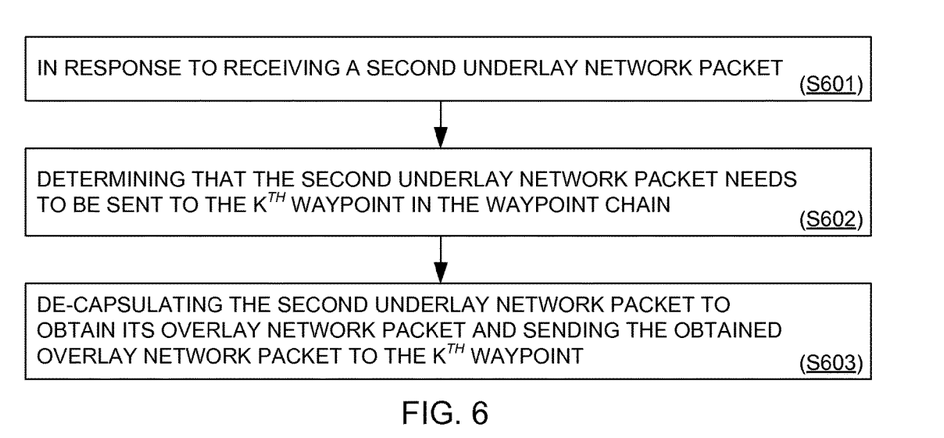
FIG. 6 illustrates a flow diagram of a method used by the overlay switch described in FIG. 3, in accordance with an exemplary embodiment of the present invention.

In another embodiment, FIG. 6 shows a flowchart including additional steps that may be included in the method used by the overlay switch described in FIG. 3. According to FIG. 6, the method comprises: In step S601, in response to receiving a second underlay network packet, executing steps of: in step S602, determining that the second underlay network packet needs to be sent to the $K^{th}$ waypoint in the waypoint chain, wherein, K is a positive integer. Then, in step S603, de-capsulating the second underlay network packet to obtain its overlay network packet and sending the obtained overlay network packet to the $K^{th}$ waypoint.

Returning to FIG. 4, the method shown in FIG. 6 corresponds to the second stage of FIG. 4: specific steps of FIG. 6 correspond to part of a processing procedure of OSW2 and part of processing procedure of OSW3 in FIG. 4. Here, first look at the part of processing flow of OSW2. Specifically, in step 1, OSW2 receives the underlay network packet (sent from OSW1). In step 2, OSW2 obtains a waypoint chain {W1-W4} according to a query for source address and destination address of header of that underlay network packet. In other words, the underlay network packet needs to pass through the waypoint chain. In step 3, if OSW2 is connected to a single waypoint, then OSW2 determines that it is connected to waypoint W1 according to information of the waypoint chain. As such, OSW2 is connected to the $K^{th}$ waypoint in the waypoint chain, where K=1, that is to say, the underlay network packet needs to be sent to W1. However, if OSW2 is connected to a plurality of waypoints, then OSW2 determines that the underlay network packet is to be sent to W1 according to identification of the next waypoint of the underlay network packet. In step 4, OSW2 de-capsulates the underlay network packet to obtain its overlay network packet, and sends the obtained overlay network packet to W1. The remaining part of processing procedure of OSW3 will be described later herein.

Figure 7:
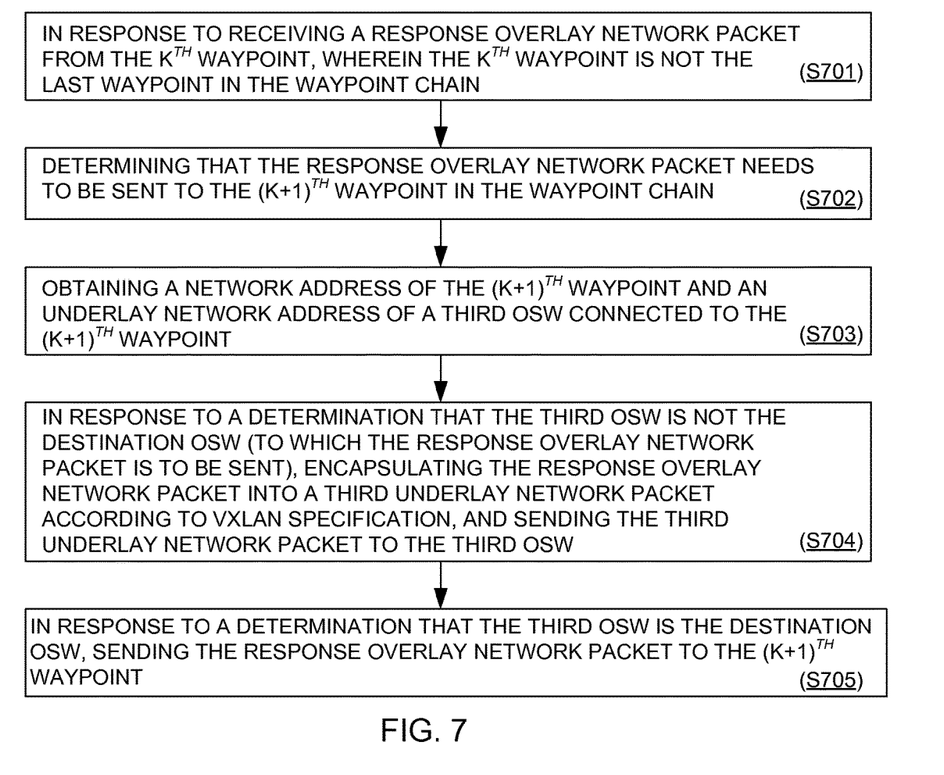
FIG. 7 illustrates a flow diagram of a method used by the overlay switch described in FIG. 6, in accordance with an exemplary embodiment of the present invention.

In another embodiment of the present invention, FIG. 7 shows a flowchart including additional steps that may be included in the method used by the overlay switch described in FIG. 6. According to FIG. 7, the method comprises: in step S701, in response to receiving a response overlay network packet from the $K^{th}$ waypoint, wherein the $K^{th}$ waypoint is not the last waypoint in the waypoint chain, executing steps of: in step S702, determining that the response overlay network packet needs to be sent to the $(K+1)^{th}$ waypoint in the waypoint chain. In step S703, obtaining a network address of the $(K+1)^{th}$ waypoint and an underlay network address of a third OSW connected to the $(K+1)^{th}$ waypoint. In step 704, in response to a determination that the third OSW is not the destination OSW (to which the response overlay network packet is to be sent), encapsulating the response overlay network packet into a third underlay network packet according to VxLAN specification, and sending the third underlay network packet to the third OSW, wherein a destination IP field of header of the third underlay network packet is set to be the underlay network address of the third OSW. In step S705, as an alternative to S704, in response to a determination that the third OSW is the destination OSW, sending the response overlay network packet to the $(K+1)^{th}$ waypoint.

Returning to FIG. 4, the method shown in FIG. 7 can be seen to correspond to the third stage of FIG. 4. As such, specific steps in FIG. 7 correspond to a further processing flow of OSW2 of FIG. 4. Specifically, in step 1, OSW2 receives the overlay network packet from the waypoint W1, and according to the waypoint chain, OSW2 determines that W1 is not the last waypoint in the waypoint chain. In step 2, according to the waypoint chain, OSW2 confirms that a next waypoint to waypoint W1 is W2, and that W2 is connected to OSW2. OSW2 obtains underlay network address of OSW2 and network address of W2. In step 3, after determining that the only OSW connected to W2 is just OSW2, OSW2 sends the response overlay network packet to the waypoint W2. In step 4, the overlay network packet is received from waypoint W2, and according to the waypoint chain, OSW2 determines that W2 is not the last waypoint in the waypoint chain. In step 5, according to the waypoint chain, OSW2 confirms that a next waypoint to waypoint W2 is W3, and that W3 is connected to OSW3. OSW2 obtains the underlay network address of OSW3 and network address of W3. In step 6, after determining that OSW3 is not itself W3 (i.e., W3 is not the same as OSW3), OSW2 encapsulates the response overlay network packet into an underlay network packet according to VxLAN specification, wherein, a destination IP field of header of the underlay network packet is set to be the underlay network address of OSW3. OSW2 sends the underlay network packet to OSW3. Further, OSW2 sets an index of the next waypoint in the underlay network packet to 3, i.e., the next waypoint is a third waypoint in the waypoint chain.

Part of processing procedure of OSW3 in FIG. 4 corresponds to the processing procedure of FIG. 6. Specifically, in step 1, OSW3 receives the underlay network packet (sent from OSW2). In step 2, OSW3 obtains the waypoint chain {W1-W4} based on results from a query for source address and destination address of header of the overlay network packet of the underlay network packet, i.e., the waypoint chain that needs to be passed by the underlay network packet. In step 3, if OSW3 is connected to a single waypoint, then OSW3 determines that it is connected to the waypoint W3 according to information of the waypoint chain. In this case, OSW3 determines that OSW3 is connected to the third waypoint in the waypoint chain and that the underlay network packet needs to be sent to W3. In one scenario and embodiment, OSW3 is connected to a plurality of waypoints. As such, OSW3 determines that the underlay network packet is to be sent to W3 according to identification of the next waypoint of the underlay network packet. In step 4, OSW3 de-capsulates the underlay network packet to obtain its overlay network packet, and sends the obtained overlay network packet to W3.

Another part of the processing procedure of OSW3 in FIG. 4 corresponds to the processing procedure of FIG. 7. Specifically, a part of the processing procedure of OSW3 is similar to the processing procedure after OSW2 processes the response overlay network packet received from the W2, which will not be repeated here. In FIG. 4, the procedure that OSW2 receives the underlay network packet from OSW3 and sends it to W4 is similar to the processing procedure that OSW2 receives the underlay network packet from OSW1 and sends it to W1, which will not be repeated here.

Figure 8:
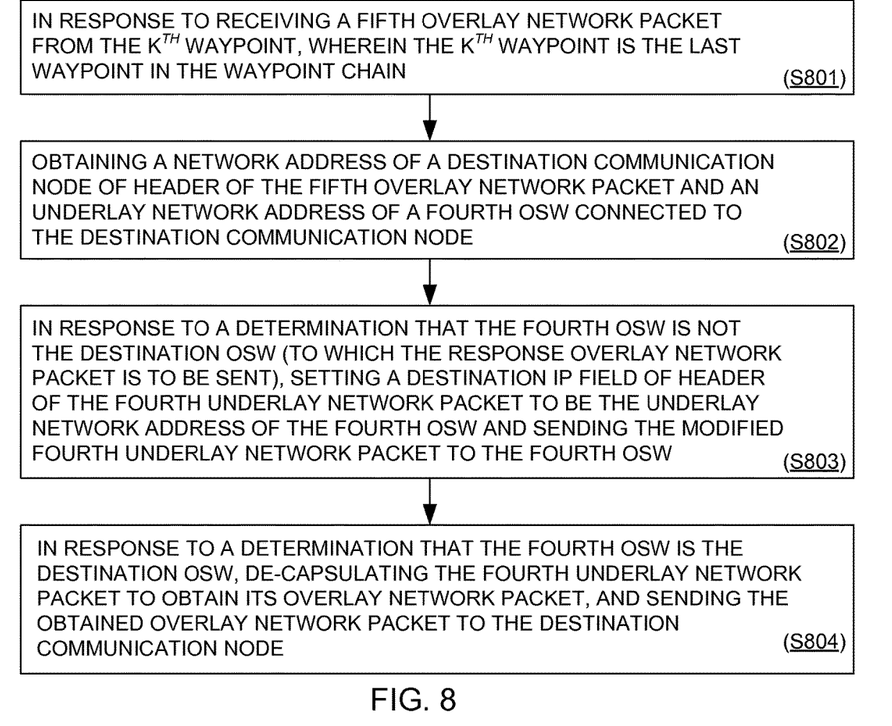
FIG. 8 illustrates a flow diagram of a method used by the overlay switch described in FIG. 6, in accordance with an exemplary embodiment of the present invention.

In another embodiment, FIG. 8 is a flowchart illustrating processes further contained in the method used by the overlay switch described in FIG. 6. According to FIG. 8, the method comprises: in step S801, in response to receiving a fifth overlay network packet from the $K^{th}$ waypoint, wherein the $K^{th}$ waypoint is the last waypoint in the waypoint chain, executing steps of: in step S802, obtaining a network address of a destination communication node of header of the fifth overlay network packet and an underlay network address of a fourth OSW connected to the destination communication node. In step S803, in response to a determination that the fourth OSW is not the destination OSW (to which the response overlay network packet is to be sent), setting a destination IP field of header of the fourth underlay network packet to be the underlay network address of the fourth OSW and the modified fourth underlay network packet is sent to the fourth OSW. In step S804, as an alternative to S803, in response to a determination that the fourth OSW is the destination OSW, de-capsulating the fourth underlay network packet to obtain its overlay network packet, and sending the obtained overlay network packet to the destination communication node.

Returning to FIG. 4, the method shown in FIG. 8 corresponds to the fourth stage in FIG. 4: OSW2 connected to the last waypoint receives the overlay network packet from waypoint W4, encapsulates and then sends it to the relevant processing flow of OSW4. Specifically, in step 1, OSW2 receives the underlay network packet (sent from OSW3). In Step 2, OSW2 determines that the waypoint W4 is the last waypoint in the waypoint chain according to the index in the underlay network packet. In step 3, OSW2 obtains the underlay network address of OSW4, which is connected to the destination communication node of header of the overlay network packet, and determines that OSW4 is not itself OSW2 (i.e., OSW2 is not the same as OSW4). OSW2 sets the destination IP field of header of the underlay network packet as the underlay network address of OSW4, and sends the modified underlay network packet to OSW4. In addition, identification of the next waypoint in the underlay network packet is set to index of the waypoint included in the waypoint chain plus 1, e.g., in this case, it is set to 5. In another embodiment, it is assumed that VM2 is directly connected to OSW2. As such, in response to a determination that OSW4 is OSW2, the network packet of this layer is de-capsulated to obtain its overlay network packet, and the obtained overlay network packet is sent to the destination communication node.

Figure 9:
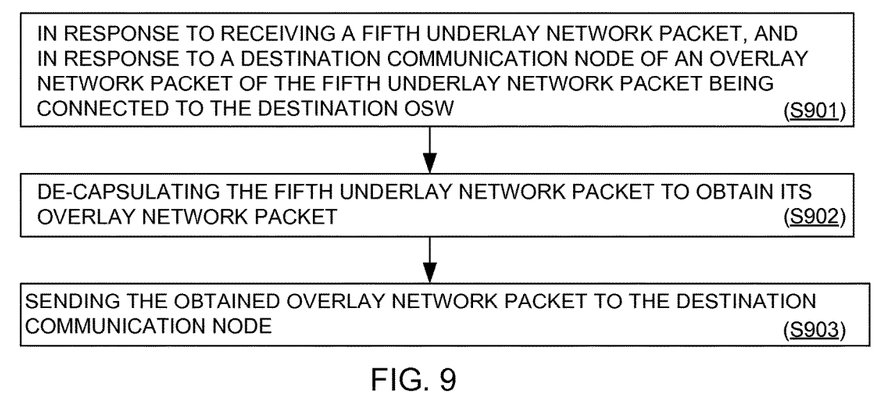
FIG. 9 illustrates a flow diagram of a method used by the overlay switch described in FIG. 8, in accordance with an exemplary embodiment of the present invention.

In another embodiment of the present invention, FIG. 9 is a flowchart illustrating processes further included in the method used by the overlay switch described in FIG. 8. According to FIG. 9, the method comprises: in step S901, in response to receiving a fifth underlay network packet, and in response to a destination communication node of an overlay network packet of the fifth underlay network packet being connected to the destination OSW, executing steps of: in step S902, de-capsulating the fifth underlay network packet to obtain its overlay network packet; in step S903, sending the obtained overlay network packet to the destination communication node.

Returning to FIG. 4, the method shown in FIG. 9 corresponds to the fifth stage of FIG. 4, which includes a processing flow of OSW4. Specific steps in FIG. 8 correspond to the flow in FIG. 4 in which the destination OSW is OSW4. Specifically, in step 1, OSW4 receives the underlay network packet (sent from OSW3). In step 2, OSW4 determines that its underlay network address is the same as the destination communication address of header of the overlay network packet of the underlay network packet. In response, OSW4 de-capsulates the underlay network packet to obtain its overlay network packet and then sends the obtained overlay network packet to the destination communication node VM2. In one embodiment, OSW4 has the functionality to directly determine that it is connected to the destination communication address (of header of the overlay network packet) according to an index of the waypoint included in the underlay network packet. In this scenario and embodiment, if the index of the waypoint included in the underlay network packet has exceeded the number of all the waypoints included in the waypoint chain, then the underlay network address of the overlay switch is the same as the destination address of header of the overlay network packet of the underlay network packet.

Functions possessed by an OSW have been provided using specific examples. However, those skilled in the art will appreciate that, an OSW may be any one of OSW1, OSW2, OSW3 and OSW4. Further, a given OSW can have the functions of respective OSWs OSW1, OSW2, OSW3 and OSW4 progressively, or in part, in accordance with an embodiment of the present invention.

Figure 10:
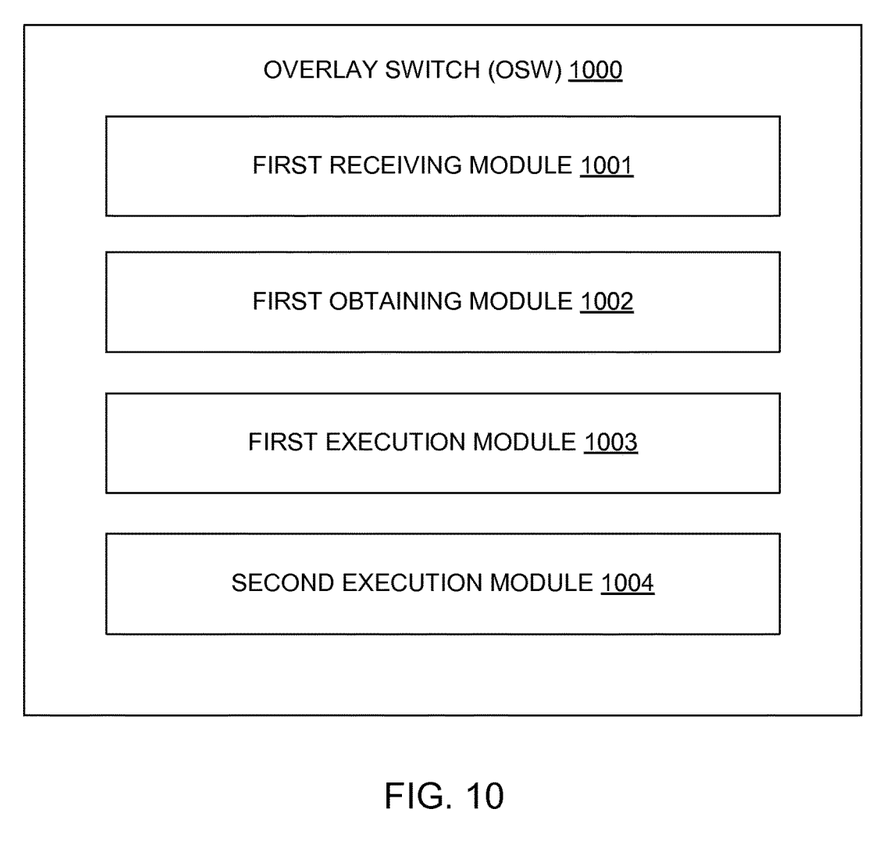
FIG. 10 shows a structural block diagram of an OSW, in accordance with an exemplary embodiment of the present invention.

Under a same inventive concept, an embodiment of the present invention further discloses an overlay switch (OSW). FIG. 10 shows a structural block diagram of an OSW 1000 according to an embodiment of the present invention. According to FIG. 10, the OSW comprises: a first receiving module 1001 configured to receive a unicast packet, wherein the unicast packet needs to pass a waypoint chain consisting of a number of waypoints; a first obtaining module 1002 configured to obtain network address of a first waypoint of the waypoint chain and underlay network address of a second OSW connected to the first waypoint; a first execution module 1003 configured to, in response to a determination that the second OSW is not the destination OSW to which the unicast packet is to be sent, encapsulate the unicast packet into a first underlay network packet according to VxLAN specification, wherein a destination IP field of header of the first underlay network packet is set to be the underlay network address of the second OSW, and send the first underlay network packet to the second OSW; and a second execution module 1004 configured to, in response to a determination that the second OSW is the OSW, send the unicast packet as an overlay network packet to the first waypoint.

In one embodiment, in response to a scenario wherein there are a plurality of waypoints in the waypoint chain that are connected to one OSW, each underlay network packet also contains therein an identification of a next waypoint to which that underlay network packet is to be sent. Further, the identification of the next waypoint is an index of the next waypoint in the waypoint chain.

In one embodiment, the OSW further comprises (not shown in FIG. 10): a second receiving module configured to receive a second underlay network packet; a first determination module configured to determine that the second underlay network packet needs to be sent to the $K^{th}$ waypoint in the waypoint chain, wherein, K is a positive integer; and a third execution module configured to de-capsulate the second underlay network packet to obtain its overlay network packet and send the obtained overlay network packet to the $K^{th}$ waypoint.

In one embodiment, the OSW further comprises (not shown in FIG. 10): a third receiving module configured to receive a response overlay network packet from the $K^{th}$ waypoint, and the $K^{th}$ waypoint is not the last waypoint in the waypoint chain; a second determination module configured to determine that the response overlay network packet needs to be sent to the $(K+1)^{th}$ waypoint in the waypoint chain; a second obtaining module configured to obtain network address of the $(K+1)^{th}$ waypoint and underlay network address of a third OSW connected to the $(K+1)^{th}$ waypoint; a fourth execution module configured to, in response to a determination that the third OSW is not the destination OSW to which the response overlay network packet is to be sent, encapsulate the response overlay network packet into a third underlay network packet according to VxLAN specification, and send the third underlay network packet to the third OSW, wherein a destination IP field of header of the third underlay network packet is set to be the underlay network address of the third OSW; and a fifth execution module configured to, in response to a determination that the third OSW is the OSW, send the overlay network packet to the $(K+1)^{th}$ waypoint.

In one embodiment, the OSW further comprises (not shown in FIG. 10): a fourth receiving module configured to receive a response overlay network packet from the $K^{th}$ waypoint, and the $K^{th}$ waypoint is the last waypoint in the waypoint chain; a third obtaining module configured to obtain network address of a destination communication node of header of the response overlay network packet and underlay network address of a fourth OSW connected to the destination communication node; a sixth execution module configured to, in response to a determination that the fourth OSW is not the OSW, set a destination IP field of header of the fourth underlay network packet to be the underlay network address of the fourth OSW, and send the modified fourth underlay network packet to the fourth OSW; and a seventh execution module configured to, in response to a determination that the fourth OSW is the OSW, de-capsulate the fourth underlay network packet to obtain its overlay network packet, and send the obtained overlay network packet to the destination communication node.

In one embodiment, the OSW further comprises (not shown in FIG. 10): a fifth receiving module configured to receive a fifth underlay network packet, and a destination communication node of an overlay network packet of the fifth underlay network packet is connected to the OSW; and an eighth execution module configured to de-capsulate the fifth underlay network packet to obtain its overlay network packet, and send the obtained overlay network packet to the destination communication node.

In one embodiment, information of the waypoint chain consisting of a number of waypoints in the OSW is stored in a server, and each OSW obtains the information of the waypoint chain through communication with the server.

In one embodiment, information of the waypoint chain consisting of a number of waypoints in the OSW is stored in each OSW of the overlay network.

In one embodiment, information of the waypoint chain in the OSW includes: an address of a source communication node, an address of a destination communication node, a set of waypoints that needs to be passed when a network packet is sent from a source communication node to a destination communication node, wherein the set of waypoints includes underlay network address of OSW connected to each waypoint, and the network addresses of that waypoint.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create module for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method used by an overlay switch (OSW), comprising: in response to receiving a unicast packet to be sent to a first OSW, wherein the unicast packet needs to pass a waypoint chain including a number of waypoints, executing steps of: obtaining a network address of a first waypoint of the waypoint chain and an underlay network address of a second OSW connected to the first waypoint; in response to a determination that the second OSW is not the first OSW, encapsulating the unicast packet into a first underlay network packet according to a specification of an overlay network, wherein a field of a destination header of the first underlay network packet includes the underlay network address of the second OSW; in response to a determination that there are a plurality of waypoints in the waypoint chain that are connected to one OSW, adding to the first underlay network packet an index of a next waypoint in the waypoint chain to which the first underlay network packet is to be sent; sending the first underlay network packet to the second OSW; in response to receiving a second underlay network packet, executing steps of: determining whether the second underlay network packet needs to be sent to a $K^{th}$ waypoint in the waypoint chain, wherein, K is a positive integer; responsive to a determination that the second underlay network packet needs to be sent to a $K^{th}$ waypoint, de-capsulating the second underlay network packet to obtain its overlay network packet; and sending the overlay network packet to the $K^{th}$ waypoint.

2. The method according to claim 1, further comprising: in response to receiving a response overlay network packet from the $K^{th}$ waypoint, wherein the $K^{th}$ waypoint is not a last waypoint in the waypoint chain, executing steps of: determining whether the response overlay network packet needs to be sent to the $(K+1)^{th}$ waypoint in the waypoint chain; in response to a determination that the response overlay network packet needs to be sent to the $(K+1)^{th}$ waypoint, obtaining i) a network address of the $(K+1)^{th}$ waypoint and ii) an underlay network address of a third OSW connected to the $(K+1)^{th}$ waypoint; in response to a determination that the third OSW is not the first OSW, encapsulating the response overlay network packet into a third underlay network packet according to a specification of an overlay network, and sending the third underlay network packet to the third OSW, wherein a field of a destination header of the third underlay network packet includes the underlay network address of the third OSW.

3. The method according to claim 1, further comprising: in response to receiving a response overlay network packet from the $K^{th}$ waypoint, wherein the $K^{th}$ waypoint is a last waypoint in the waypoint chain, executing steps of: obtaining i) a network address of a destination communication node included in a header of the response overlay network packet, and ii) an underlay network address of a fourth OSW connected to the destination communication node; and in response to a determination that the fourth OSW is the first OSW, de-capsulating a fourth underlay network packet to obtain its overlay network packet, and sending that overlay network packet to the destination communication node.

4. The method according to claim 3, further comprising: in response to receiving a fifth underlay network packet, wherein a destination communication node of an overlay network packet of the fifth underlay network packet is connected to the first OSW, executing steps of: de-capsulating the fifth underlay network packet to obtain its overlay network packet; and sending the obtained overlay network packet to the destination communication node.

5. The method according to claim 1, wherein: information of the waypoint chain is stored in a server, and wherein a given OSW obtains information regarding the waypoint chain through communication with the server.

6. The method according to claim 1: wherein, information regarding the waypoint chain is stored in at least one OSW of an overlay network.

7. The method according to claim 1, wherein: there exists an information regarding the waypoint chain that includes one or more of: an address of a source communication node, an address of a destination communication node, a set of waypoints that needs to be passed when a unicast packet is sent from a source communication node to a destination communication node; and wherein the set of waypoints includes an underlay network address of one or more OSW connected to a given waypoint included in the set of waypoints, and a network address of that waypoint.

8. A computer program product for an overlay switch (OSW), comprising: one or more computer-readable storage media and program instructions comprising: program instructions to receive a unicast packet, wherein the unicast packet needs to pass a waypoint chain consisting of a number of waypoints; program instructions to obtain a network address of a first waypoint of the waypoint chain and an underlay network address of a second OSW connected to the first waypoint; program instructions to respond to a determination that the second OSW is not a first OSW by encapsulating the unicast packet into a first underlay network packet according to a specification of an overlay network, wherein a field of a destination header of the first underlay network packet includes the underlay network address of the second OSW program instructions to respond to a determination that there are a plurality of waypoints in a waypoint chain that are connected to one OSW by adding to an underlay network packet an index of a next waypoint in the waypoint chain to which that underlay network packet is to be sent; program instructions to send the first underlay network packet to the second OSW; program instructions to receive a second underlay network packet; program instructions to determine whether the second underlay network packet needs to be sent to a $K^{th}$ waypoint in the waypoint chain, wherein, K is a positive integer; program instructions to respond to a determination that the second underlay network packet needs to be sent to a $K^{th}$ waypoint by i) de-capsulating the second underlay network packet to obtain its overlay network packet, and ii) sending that overlay network packet to the $K^{th}$ waypoint.

9. The OSW according to claim 8, further comprising: program instructions to receive a response overlay network packet from the $K^{th}$ waypoint, wherein the $K^{th}$ waypoint is not a last waypoint in the waypoint chain; program instructions to determine whether the response overlay network packet needs to be sent to the $(K+1)^{th}$ waypoint in the waypoint chain; program instructions to respond to a determination that the response overlay network packet needs to be sent to the $(K+1)^{th}$ waypoint by obtaining i) a network address of the $(K+1)^{th}$ waypoint and ii) an underlay network address of a third OSW connected to the $(K+1)^{th}$ waypoint; program instructions to respond to a determination that the third OSW is not the first OSW by encapsulating the response overlay network packet into a third underlay network packet according to a specification of an overlay network, and sending the third underlay network packet to the third OSW, wherein a field of a destination header of the third underlay network packet includes the underlay network address of the third OSW.

10. The OSW according to claim 8, further comprising: program instructions to receive a response overlay network packet from the $K^{th}$ waypoint, wherein the $K^{th}$ waypoint is a last waypoint in the waypoint chain; program instructions to obtain i) a network address of a destination communication node included in a header of the response overlay network packet, and ii) an underlay network address of a fourth OSW connected to the destination communication node; program instructions to respond to a determination that the fourth OSW is the OSW by i) de-capsulating a fourth underlay network packet to obtain its overlay network packet, and ii) sending that overlay network packet to the destination communication node.

11. The OSW according to claim 10, further comprising: program instructions to receive a fifth underlay network packet, wherein a destination communication node of an overlay network packet of the fifth underlay network packet is connected to the first OSW; and program instructions to i) de-capsulate the fifth underlay network packet to obtain its overlay network packet, and ii) send the obtained overlay network packet to the destination communication node.

12. The OSW according to claim 10, further comprising: program instructions to receive a fifth underlay network packet, wherein a destination communication node of an overlay network packet of the fifth underlay network packet is connected to the first OSW; and program instructions to i) de-capsulate the fifth underlay network packet to obtain its overlay network packet, and rig send the obtained overlay network packet to the destination communication node.

13. The OSW according to claim 8: wherein, information of the waypoint chain is stored in a server, and wherein a given OSW obtains information regarding the waypoint chain through communication with the server.

14. The OW according to claim 8: wherein, information regarding the waypoint chain is stored in at least one OSW of an overlay network.

15. The OSW according to claim 8, wherein, there exists an information regarding the waypoint chain that includes one or more of: an address of a source communication node, an address of a destination communication node, a set of waypoints that needs to be passed when a unicast packet is sent from a source communication node to a destination communication node; and wherein the set of waypoints includes an underlay network address of one or more OSW connected to a given waypoint included in the set of waypoints, and a network address of that waypoint.

16. The OSW according to claim 8, further comprising: program instructions to receive a response overlay network packet from the $K^{th}$ waypoint, wherein the $K^{th}$ waypoint is not a last waypoint in the waypoint chain; program instructions to determine whether the response overlay network packet needs to be sent to the $(K+1)^{th}$ waypoint in the waypoint chain; program instructions to respond to a determination that the response overlay network packet needs to be sent to the $(K+1)^{th}$ waypoint by obtaining i) a network address of the $(K+1)^{th}$ waypoint and ii) an underlay network address of a third OSW connected to the $(K+1)^{th}$ waypoint; program instructions to respond to a determination that the third OSW is not the first OSW by encapsulating the response overlay network packet into a third underlay network packet according to a specification of an overlay network, and sending the third underlay network packet to the third OSW, wherein a field of a destination header of the third underlay network packet includes the underlay network address of the third OSW.

17. The OSW according to claim 8, further comprising: program instructions to receive a response overlay network packet from the $K^{th}$ waypoint, wherein the $K^{th}$ waypoint is a last waypoint in the waypoint chain; program instructions to obtain i) a network address of a destination communication node included in a header of the response overlay network packet, and ii) an underlay network address of a fourth OSW connected to the destination communication node; program instructions to respond to a determination that the fourth OSW is the OSW by i) de-capsulating a fourth underlay network packet to obtain its overlay network packet, and ii) sending that overlay network packet to the destination communication node.

18. The OSW according to claim 8: wherein, information of the waypoint chain is stored in a server, and wherein a given OSW obtains information regarding the waypoint chain through communication with the server.

19. The OSW according to claim 8: wherein, information regarding the waypoint chain is stored in at least one OSW of an overlay network, wherein the information regarding the waypoint chain includes one or more of: an address of a source communication node, an address of a destination communication node, a set of waypoints that needs to be passed when a unicast packet is sent from a source communication node to a destination communication node; and wherein the set of waypoints includes an underlay network address of one or more OSW connected to a given waypoint included in the set of waypoints, and a network address of that waypoint.

20. A computer system that has an overlay switch (OSW), comprising: one or more computer processors; one or more computer readable storage medium; program instructions stored on the computer readable storage medium for execution by at least one of the one or more processors, the program instructions of the OSW comprising: program instructions to receive a unicast packet, wherein the unicast packet needs to pass a waypoint chain consisting of a number of waypoints; program instructions to obtain a network address of a first waypoint of the waypoint chain and an underlay network address of a second OSW connected to the first waypoint; program instructions to respond to a determination that the second OSW is not a first OSW by encapsulating the unicast packet into a first underlay network packet according to a specification of an overlay network, wherein a field of a destination header of the first underlay network packet includes the underlay network address of the second OSW; program instructions to respond to a determination that there are a plurality of waypoints in a waypoint chain that are connected to one OSW by adding to an underlay network packet an index of a next waypoint in the waypoint chain to which that underlay network packet is to be sent; program instructions to send the first underlay network packet to the second OSW; program instructions to receive a second underlay network packet; program instructions to determine whether the second underlay network packet needs to be sent to a $K^{th}$ waypoint in the waypoint chain, wherein, K is a positive integer; program instructions to respond to a determination that the second underlay network packet needs to be sent to a $K^{th}$ waypoint by i) de-capsulating the second underlay network packet to obtain its overlay network packet, and ii) sending that overlay network packet to the K'h waypoint.

* * * * *